(12) United States Patent
Karol

(10) Patent No.: US 10,563,002 B2
(45) Date of Patent: Feb. 18, 2020

(54) METHODS AND PRODUCT FOR FORMING LINES UTILIZING LIQUID ACRYLIC COPOLYMER SOLUTION

(71) Applicant: LIQUID LINES, LLC, Thornwood, NY (US)

(72) Inventor: Jason D Karol, Thornwood, NY (US)

(73) Assignee: Liquid Lines, LLC, Thornwood, NY (US)

( * ) Notice: Subject to any disclaimer, the term of this patent is extended or adjusted under 35 U.S.C. 154(b) by 242 days.

(21) Appl. No.: 15/638,034

(22) Filed: Jun. 29, 2017

(65) Prior Publication Data

US 2018/0002477 A1    Jan. 4, 2018

Related U.S. Application Data

(60) Provisional application No. 62/376,375, filed on Aug. 17, 2016, provisional application No. 62/357,354, filed on Jun. 30, 2016.

(51) Int. Cl.
| | | |
|---|---|---|
| *C04B 26/06* | (2006.01) | |
| *C04B 14/30* | (2006.01) | |
| *C04B 24/02* | (2006.01) | |
| *C08G 18/08* | (2006.01) | |
| *C09D 175/04* | (2006.01) | |
| *C09G 1/10* | (2006.01) | |
| *C04B 103/40* | (2006.01) | |
| *C04B 111/60* | (2006.01) | |

(52) U.S. Cl.
CPC .......... *C08G 18/0866* (2013.01); *C04B 26/06* (2013.01); *C08G 18/0852* (2013.01); *C09D 175/04* (2013.01); *C09G 1/10* (2013.01); *C04B 2103/40* (2013.01); *C04B 2111/60* (2013.01)

(58) Field of Classification Search
CPC ....... C04B 26/06; C04B 14/305; C08B 24/02; C08B 24/023; C08G 18/0866
See application file for complete search history.

(56) References Cited

U.S. PATENT DOCUMENTS

| | | | |
|---|---|---|---|
| 3,573,239 A | * | 3/1971 | Zdanowski ........ C09D 133/062 524/77 |
| 4,046,934 A | | 9/1977 | Gustafson |
| 4,315,957 A | | 2/1982 | Hereth et al. |
| 4,497,919 A | | 2/1985 | Varga et al. |
| 4,594,109 A | | 6/1986 | Kawabata |
| 4,622,360 A | | 11/1986 | Gomi et al. |
| 4,792,252 A | | 12/1988 | Kremer et al. |
| 5,049,186 A | | 9/1991 | Kawabata |
| 5,387,434 A | | 2/1995 | Black et al. |
| 5,568,990 A | | 10/1996 | Mcauley |
| 5,773,091 A | | 6/1998 | Perlman et al. |
| 5,899,624 A | | 5/1999 | Thompson |
| 6,410,634 B2 | * | 6/2002 | Rufus ...................... C09G 1/04 524/430 |
| 6,800,171 B2 | | 10/2004 | Van Tyle et al. |
| 8,021,077 B2 | | 9/2011 | Annese et al. |
| 2015/0190844 A1 | * | 7/2015 | Boulanger ........... C09D 133/08 427/299 |
| 2019/0023907 A1 | * | 1/2019 | Merten ................ C08G 18/797 |

FOREIGN PATENT DOCUMENTS

GB    1260477 A   *  1/1972   ........... C09D 133/06

\* cited by examiner

*Primary Examiner* — Karuna P Reddy
(74) *Attorney, Agent, or Firm* — Goma Law, PLLC

(57) ABSTRACT

A liquid water-based solution for application of temporary floor markings on a polyurethane coated floor and a method of applying the same is disclosed. According to one aspect, the solution comprises 5-15% by weight of an acrylic copolymer, 1%-2% propylene glycol, 0.5%-2% dipropylene glycol mono-methyl-ether, 2-8% of titanium dioxide; and 1-5% of ethelyne glycol. The solution is dispensable through a foam applicator so that it can be used to form temporary lines for recreational and athletic activities. The solution has a drying time when applied to the polyurethane floor of under five minutes and can remains water soluble for an extended period of time so that it can be removed without damaging the underlying surface.

8 Claims, No Drawings

METHODS AND PRODUCT FOR FORMING LINES UTILIZING LIQUID ACRYLIC COPOLYMER SOLUTION

CROSS REFERENCE TO RELATED APPLICATIONS

This application claims the benefit of an earlier filing date under 35 U.S.C. § 120 of U.S. Provisional Application No. 62/357,354, filed on Jun. 30, 2016, and of U.S. Provisional Application No. 62/376,375, filed on Aug. 17, 2017, each of which are incorporated by reference herein in their entirety.

BACKGROUND

For many recreational and sporting activities, the need exists for providing temporary markings on floors to provide certain boundaries based on the activity or sport. Conventionally, these markings are made using floor tape products which adhere to the floor surface and are removed when the activity has ended or the floors need to be cleaned or resurfaced. For example, floor tape is conventionally used to provide markings on gymnasium floors to provide the outline and various play surface lines for different activities (e.g., volleyball, pickle ball, indoor soccer, fitness lines for agility matters, exercise markings, designated spots for students, etc.)

A problem exists in the use of floor tape for preparing such markings since floor tape can be difficult to remove once it has been on a surface for an extended period of time (e.g., weeks or months). In addition, the adhesive on floor tape leaves behind a residue once it has been removed that is difficult to clean. It is also common that, once the floor tape has been applied for an extended period of time to a surface, the adhesive hardens to the floor surface such that when it is removed it damages the floor surface or protective coatings on the floor surface.

In particular, most gymnasium floors are typically coated with a polyurethane resin coating for protection of the floor surface. Examples of such coatings are described, for example, in U.S. Pat. No. 4,622,360, the contents of which are incorporated herein by reference in their entirety. Recoating or resurfacing gymnasium floors with a polyurethane resin due to damage is costly, and damage to such coatings from the use of floor tape products is a common reason for necessitating such resurfacing expenses.

SUMMARY

According to one embodiment, methods and products are described for the formation of marking lines using a liquid water based solution containing a copolymer resin and wax-emulsion. According to another embodiment, methods and products are described for the formation of marking lines using a liquid water based solution containing an acrylic copolymer resin. The solution can be applied to make lines on various surfaces in liquid form. Once the liquid has dried, it can be walked on or played on (e.g., using soft soled shoes) without damaging the lines which have been formed. The dried compound is water soluble, such that upon completion of the activity the compound forming the lines can be removed with water (e.g., using a mop or cleaning rag).

DETAILED DESCRIPTION

The following detailed description of certain embodiments presents various descriptions of specific embodiments of the invention. However, the invention can be embodied in a multitude of different ways as defined and covered by the claims.

Methods and products are described for the formation of marking lines using a liquid water based solution containing a copolymer resin and wax-emulsion. The liquid water based solution may include a mixture of polymers and copolymers (e.g., vinyl acrylic copolymer) composing approximately 5-15% by volume of the solution, one or more coloring agents (e.g., titanium dioxide, dyes, food coloring) composing approximately 1-5% by volume of the solution and a wax-emulsion having one or more of naphtha, lanolin, turpentine, wax (e.g., carnauba wax), gum arabic, and ethylene glycol. Other implementations are also possible which exclude wax from the copolymer solution. For example, according to some embodiments, the liquid copolymer may include water, an acrylic emulsion and/or acrylic copolymer, gum, titanium dioxide, glycol ether, and a surfactant. A drying agent, such as alcohol, may be used to control the drying time of the mixture when applied specifically to a polyurethane coated floor. Variations to the ingredients and ratios are also possible. Examples of such ingredients which can be used to form the solution are described in U.S. Pat. Nos. 4,497,919, 4,315,957, 4,594,109 and 5,049,186, 4,046, 934, 5,387,434, 5,316,860, 5,773,091, and 6,800,171 the contents of each of which are incorporated by reference herein in their entirety.

Polyurethane coated wood floors exhibit particular challenges when attempting to formulate a temporary durable paint to form temporary floor markings. In particular, in the gymnasium or other commercial floor context, most polyurethane coated floors were traditionally oil based solutions. More recently, water based polyurethane compounds have been substituted in order to alleviate environmental concerns (e.g., Volatile Organic Compounds or VOCs). Both types of polyurethane are utilized to protect wood surfaces by providing a water resistant and wear resistant coating. As a result, adhesion of paints on these coated surfaces is difficult to achieve with traditional acrylic paints. In particular, for use of markings which are to be used on surfaces that will receive heavy activity (such as playing sports, etc.), durability and adhesion must be able to withstand impact and potential rubbing by soft soled shoes. At the same time, such paint markings cannot permeate or damage the polyurethane coating resulting in damage to the underlying wood floor surfaces.

Through experimentation with various compounds, the inventor recognized that the use of compound that is an aqueous emulsion having 5-15% by weight of an acrylic copolymer, 1%-2% propylene glycol, 0.5%-2% dipropylene glycol mono-methyl-ether, 1% to 2% of a leveling agent, 2-8% of titanium dioxide, 1-5% of ethelyne glycol, and 1-5% of gum arabic provides an effective compound to be used a temporary floor marking for polyurethane coated wood floors while maintaining water solubility over a long period of time after drying so that it can be removed without damaging the underlying surface.

The method includes determining a line marking plan based on a desired activity, applying the liquid water-based solution containing a copolymer resin to the surface based on the determined line plan, and waiting a prescribed drying time prior to commencing the activity. For example, the liquid water-based solution can be specifically formulated for application to a polyurethane surface and the drying time may be in the range of 1 to 15 minutes depending on the composition. Once the activity is complete, the hardened compound can be removed with water using a conventional cleaning tool and/or with a gentle cleaning agent without damaging the underlying surface or coatings.

The liquid solution can be applied to form any line markings which are conventionally formed by tape as discussed in the background section above without damaging the underlying surface or coatings, and may also offer additional flexibility to form other types of lines and shapes that may be useful for various activities that were not possible with conventional tape (e.g., elliptical shapes, circular shapes, and other curved lines and shapes).

The liquid solution can be applied using a sponge or foam based applicator, for example, such as described in U.S. Pat. Nos. 4,792,252; 5,568,990; and 5,899,624, the contents of each of which are incorporated by reference herein in their entirety.

The liquid solution may be applied manually or automatically utilizing a robotic assembly. When utilizing a robotic assembly, the lines marking plan may be entered manually or may be pre-programmed. The robotic assembly may form the lines by being provided a starting location of the area to be marked and may also rely on positioning from cameras or other positioning instruments as described, for example, in U.S. Pat. No. 8,021,077, the contents of which are incorporated herein by reference in its entirety.

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

The invention claimed is:

1. A liquid water-based solution for application of temporary floor markings on a polyurethane coated floor, the solution consisting of:
    5-15% by weight of an acrylic copolymer,
    1%-2% propylene glycol,
    0.5%-2% dipropylene glycol mono-methyl-ether,
    2-8% of titanium dioxide,
    1-5% of ethylene glycol, and
    water as the solvent for a remaining percentage by weight of the solution,
    wherein the solution is dispensable through a foam applicator, and
    wherein the solution has a drying time when applied to the polyurethane floor of under five minutes.

2. A liquid water-based solution for application of temporary floor markings on a polyurethane coated floor, the solution consisting of:
    5-15% by weight of an acrylic copolymer,
    1%-2% propylene glycol,
    0.5%-2% dipropylene glycol mono-methyl-ether,
    2-8% of titanium dioxide,
    1-5% of ethylene glycol,
    1-2% of a leveling agent, and
    water as the solvent for a remaining percentage by weight of the solution,
    wherein the solution is dispensable through a foam applicator, and
    wherein the solution has a drying time when applied to the polyurethane floor of under five minutes.

3. The liquid water-based solution of claim 1, wherein following the drying time, the liquid water-based solution forms a mark on the polyurethane floor that is durable to impact from soft-soled shoes.

4. The liquid water-based solution of claim 3, wherein the mark formed is water soluble.

5. A method of forming marks on a polyurethane coated wood surface, the method comprising:
    determining a marking plan based on a desired activity,
    applying a liquid water based solution to the surface based on the determined marking plan utilizing a foam applicator, wherein the water-based solution consists of:
    5-15% by weight of an acrylic copolymer,
    1%-2% propylene glycol,
    0.5%-2% dipropylene glycol mono-methyl-ether,
    2-8% of titanium dioxide,
    1-5% of ethylene glycol, and
    water as the solvent for a remaining percentage by weight of the solution; and
    waiting a prescribed drying time prior to commencing the activity, wherein the prescribed drying time is less than five minutes.

6. The method of claim 5, further comprising removing the marks with a water based cleaning agent.

7. The method of claim 5, wherein the marking plan is based on a recreational activity.

8. The method of claim 5, wherein the marking plan is based on a sport's boundary and playing surface lines.

* * * * *